United States Patent [19]
Proctor et al.

[11] Patent Number: 4,796,903
[45] Date of Patent: Jan. 10, 1989

[54] CREEPER FOR HANDICAPPED CHILDREN

[76] Inventors: David C. Proctor, P.O. Box 5202, Abilene, Tex. 79604; James M. Proctor, P.O. Box 3313, Abilene, Tex. 79608

[21] Appl. No.: 921,448

[22] Filed: Oct. 22, 1986

[51] Int. Cl.⁴ ................................................ B60P 3/00
[52] U.S. Cl. .......................... 280/87.02 W; 280/32.5; 272/70.3; 5/81 R
[58] Field of Search ..................... 280/87.01, 87.02 R, 280/87.02 W, 32.6, 47.34, 47.38, 32.5, 47.13; 272/70, 70.1, 70.2, 70.3, 70.4, 109, 70 A; 5/81 R, 81 B, 83, 84, 85, 86, 87, 88, 89

[56] References Cited

U.S. PATENT DOCUMENTS 1,687,948 10/1928 Olsen ................................ 280/32.5
2,546,726 9/1948 Creamer, Jr. .................... 280/47.13
3,222,029 12/1965 Hildemann .......................... 5/81 R
3,506,985 4/1970 Lang ..................................... 5/81 R
3,532,356 10/1970 Lillibridge ................. 280/87.02 W
3,992,023 11/1976 Moorer ....................... 280/87.02 R
4,026,547 5/1977 Silverstolpe et al. .............. 272/109
4,569,532 2/1986 Mirkarimi ................... 280/87.02 W

FOREIGN PATENT DOCUMENTS 2124507 2/1984 United Kingdom ........ 280/87.02 W

*Primary Examiner*—David M. Mitchell
*Assistant Examiner*—Brian L. Johnson
*Attorney, Agent, or Firm*—Fleit, Jacobson, Cohn & Price

[57] ABSTRACT

A flexible, cushion padded sling is suspended from a rigid back plate panel by shoulder and crotch straps releasably clamped to opposite ends of the panel. Caster wheel leg assemblies are secured to the panel adjacent said ends thereof to form a wheeled frame.

19 Claims, 2 Drawing Sheets

CREEPER FOR HANDICAPPED CHILDREN

BACKGROUND OF THE INVENTION

This invention relates to a creeping device for training handicapped children otherwise unable to crawl on their own.

For handicapped children who do not possess the necessary coordination, balance and strength to creep or crawl as in the case of a normal child, training and motivation is often required before independent creeping skills are developed. Devices for assisting retarded children in acquiring such skills, have been proposed as disclosed, for example, in U.S. Pat. Nos. 2,843,391, 3,532,356 and 3,992,023. Such prior creep or crawl training devices generally include a wheeled frame from which a body support is suspended. The child is placed on the suspended body support arranged so that its hands and feet may contact the ground in order to enable the child to propel the wheeled frame by movement of its arms and legs.

The prior art creeping devices aforementioned, have suffered from several drawbacks which include either excessive restriction of the child's head or limbs or a degree of freedom making the device unsafe. Further, prior art devices have sometimes suffered from instability and have caused discomfort to the infant.

It is therefore an important object of the present invention to provide a creeping device for handicapped children which is both safer and less restrictive in supporting the infant's body as well as to provide more comfortable support in an effective manner.

Other objects of the invention are to provide a creeper device of the aforementioned type that is more readily adjustable and capable of being disassembled for replacement and/or cleaning of parts.

SUMMARY OF THE INVENTION

In accordance with the present invention, a wheeled frame is formed by a pair of rigid leg assemblies interconnected by a relatively rigid panel member adjacent opposite longitudinal ends thereof. Caster wheel assemblies are connected to the lower ends of the leg assemblies in laterally and longitudinally spaced relation to the panel member for wheeled support of the panel member a vertical distance above the ground. The panel member constitutes a back plate below which the torso of the child's body is supported by a flexible body support sling suspended a suitable distance above the ground to permit the infant to touch the ground with its hands and feet. The flexible sling is suspended in vertical alignment below the back plate panel by flexible straps releasably anchored to the panel adjacent its opposite longitudinal ends. At one end, a single crotch strap is releasably anchored by means of a clamp. The crotch strap extends from one end of the body supporting sling between the legs of the infant through a guide notch in the panel below the clamp. At the opposite end of the sling, a pair of laterally spaced shoulder straps extend therefrom and are adapted to be releasably anchored to the corresponding end of the back plate panel by means of a pair of clamps mounted on the panel at such end. The straps extend through guide notches formed in the periphery of the panel at such end just below the two clamps. The flexible sling and straps are padded to provide cushioning along those body engaging surfaces that are tensioned under load. Also, body engaging straps extend laterally from the sling for encircling the torso of the infant and are releasable buckled above the back plate for securely and safely holding the infant in place.

The caster wheels are connected to the leg assemblies in non-interfering relationship to the child supported on the sling. At least one of the leg assemblies includes a horizontal portion bridging the top of the back plate panel adjacent one longitudinal end with a pair of side portions extending downwardly therefrom at an angle in laterally spaced relationship to the panel and terminating at lower ends to which the caster wheels are connected in longitudinally spaced relationship to the panel.

BRIEF DESCRIPTION OF DRAWING FIGURES

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENT

Figure 1:
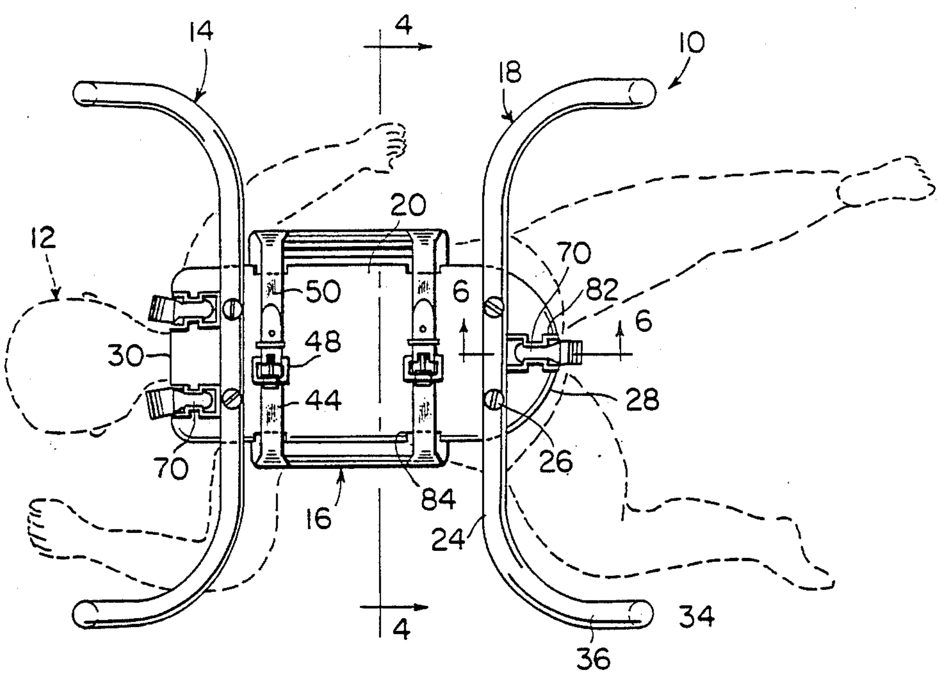
FIG. 1 is a top plan view of a creeper device constructed in accordance with one embodiment of the invention, supporting a child shown by dotted line.
Figure 4:
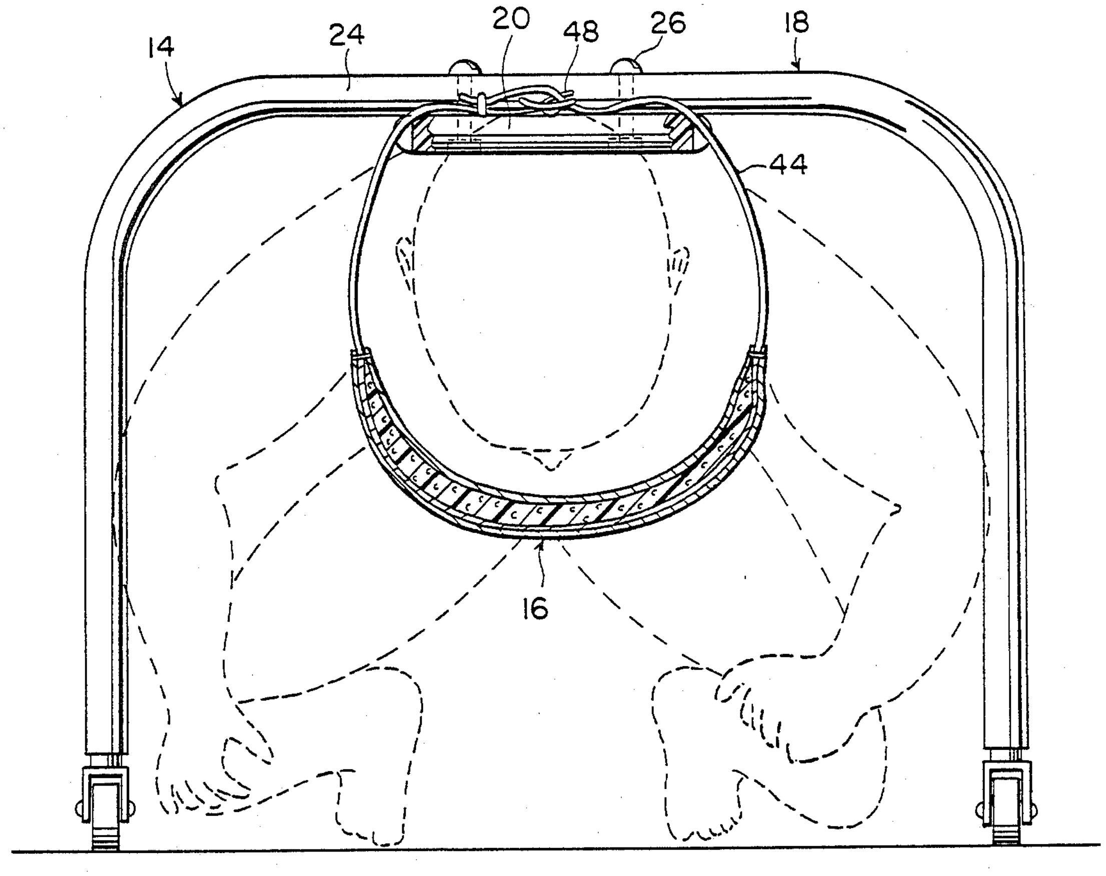
FIG. 4 is a side section view taken substantially through a plane indicated by section line 4—4 in FIG. 1.
Figure 2:
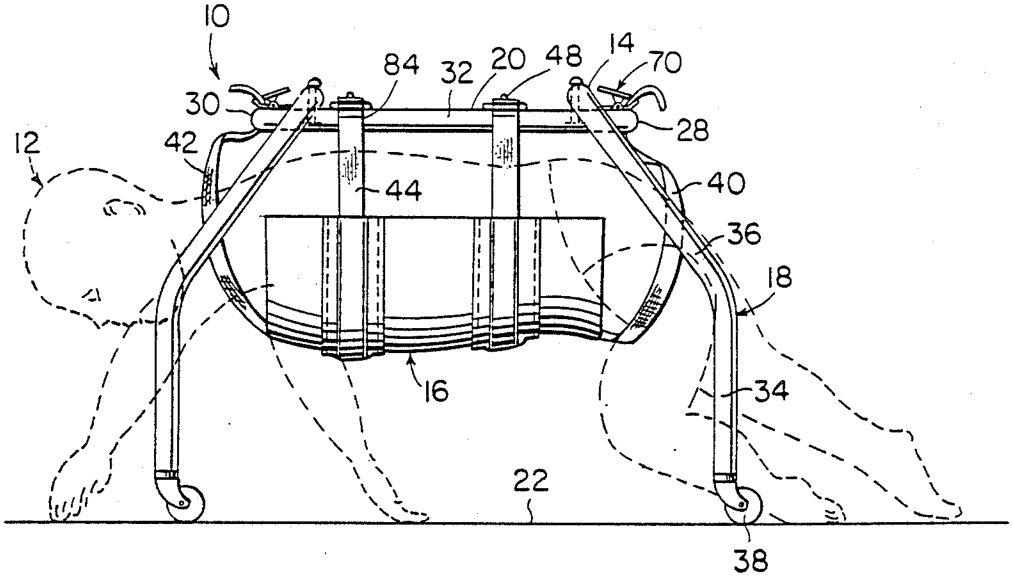
FIG. 2 is a side elevation view of the device shown in FIG. 1.

Referring now to the drawings in detail, the creeper training device is shown in its entirety in FIGS. 1 and 2 generally denoted by reference numeral 10 supporting a handicapped child 12 shown by dotted line. The creeper device 10 includes a wheeled frame assembly 14 from which a cushioned body support sling 16 is suspended. The frame assembly is formed by a pair of leg assemblies 18 interconnected in longitudinally spaced relationship to each other by a rigid backplate panel member 20. The body of the child 12 is supported by the sling 16 closely spaced below the rigid panel member 20 a predetermined distance above the floor or ground 22 as shown in FIG. 2 to enable the child to touch the ground or floor surface with its hands and feet.

Figure 6:
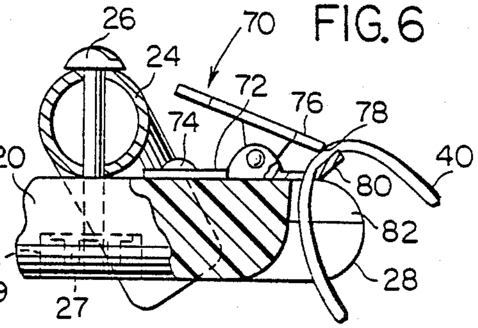
FIG. 6 is an enlarged partial section view taken substantially through a plane indicated by section line 6—6 in FIG. 1.

Each of the leg assemblies 18 is made of a tubular metal construction having a top bridging portion 24 secured to the rigid panel member 20 by a pair of fastener bolt assemblies 26. The nuts 27 associated with such bolt assemblies may be enclosed in recesses 29 formed in the underside of the panel 20 as shown by dotted line in FIG. 6. The bridging portions 24 of the leg assemblies are secured to the top of the rigid panel member 20 adjacent the opposite longitudinal ends 28 and 30 forming part of a periphery which includes parallel side edges 32. The bridging portions 24 of the leg assemblies extend laterally beyond the rigid panel member 20 toward curved portions 36 which extends downwardly at an angle from the bridging portions as more clearly seen in FIG. 2. Side portions 34 are connected to the curved portion 36, located in both laterally and longitudinally spaced relationship to the rigid panel member 20. Caster wheel assemblies 38 are pivotally connected to the lower ends of the side portions 34 of the leg assemblies. As a result of the foregoing frame configuration formed by the interconnected leg assemblies, there will be no interference between the child 12 and the wheeled frame.

Figure 3:
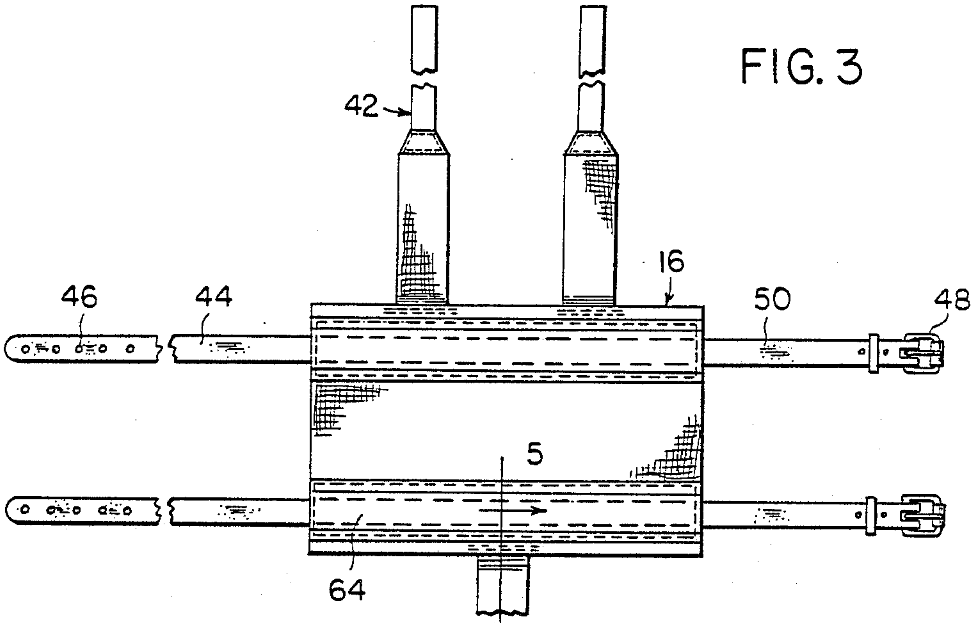
FIG. 3 is a top plan view of the flexible body supporting sling and flexible straps associated with the device as shown in FIGS. 1 and 2.

Referring now to FIG. 3 in particular, the body supporting flexible sling 16 in the illustrated embodiment is of a generally rectangular shape and is made of a quilted fabric construction. One edge of the sling has a centrally located crotch strap 40 secured thereto. The opposite edge of the sling has a pair of spaced shoulder straps 42 secured thereto, the shoulder straps 42 and the crotch strap 40 being of the same construction the straps 40 and 42 thus extend from sling 16 generally in the direction of movement of the wheeled frame assembly 16 as shown in FIG. 2. A pair of transversely extending body encircling strap sections 44 are inserted into strap guides 64 located on the sling at right angles to the suspension straps 40 and 42. A plurality of holes 46 are formed in the strap sections 44 for cooperation with buckles 48 secured to strap sections 50 extending from the parallel edge of the sling opposite the edge from which the strap sections 44 extend. Thus, the aligned body holding or positioning strap sections 44 and 50 are adjustably interconnected through the buckles 48 to form a body encircling loop with the buckled portions of the strap loop resting on the top of the rigid panel member 20 as shown in FIG. 1.

Figure 5:
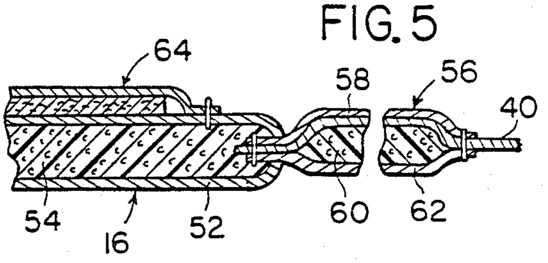
FIG. 5 is an enlarged partial section view taken substantially through a plane indicated by section line 5—5 in FIG. 3.

The construction of the flexible sling 16 is shown in greater detail in FIG. 5. The sling construction includes outer surface canvas 52 enclosing padded quilting 54. The shoulder and crotch straps 40 and 42 have padded sections 56 adjacent the sling 16. As more clearly seen in FIG. 5, the padded sections 56 of the straps are formed by a nylon type cover 58 and a foam rubber body 60 retained on the strap by an opposite cover 62 sewn to the strap and cover 58. Strap guides 64 constructed of canvas are also sewn to the supporting surface of the sling 16 extending between the aligned strap sections 44 and 50 in parallel spaced relationship to each other as shown in FIG. 3. Thus, the paddings 56 are restricted to those body engaging surfaces of the suspension straps 40 and 42 that are tensioned under load in order to provide maximum comfort to the child.

The sling 16 is adjustably suspended from the back plate panel member 20 in vertical alignment therebelow for support of the child 12, as shown, by means of the crotch strap 40 and shoulder straps 42 as aforementioned. Toward that end, the straps 40 and 42 are releasably anchored adjacent their outer ends to the back plate panel 20 by means of releasable clamp devices 70. One of such clamp devices 70 is mounted on top of the panel member 20 adjacent the longitudinal end 28 whereas a pair of such clamp devices are mounted on top of the panel member adjacent the other end 30 as shown in FIG. 1. Each clamp device as more clearly seen in FIG. 6, includes a base portion 72 secured to the panel member by a fastener 74 and a displaceable element 76 pivotally mounted on the base portion 72 under a spring bias urging clamping ends 78 and 80 into engagement with each other. Thus, the suspension straps 40 and 42 may be releasably anchored between the clamping ends 78 and 80 as more clearly seen in FIG. 6 in order to adjustably suspend the body supporting sling 16 from the rigid panel member 20.

Proper alignment of the sling 16 below the rigid panel member 20 is assured by means of guide notches 82 formed in the peripheral portion of the panel member 20 at the ends 28 and 30. The suspension straps 40 and 42 extend through the notches 82 while the strap sections 44 and 50 extend through the guide formations or notches 84 formed in the peripheral side edges 32 of the panel member so that the straps may be removed by outward movement as shown.

To use the device 10 as hereinbefore described, the sling 16 with the straps thereto while removed from the guide notches in the panel member as shown in FIG. 3, are laid out flat on one's lap with the straps extended. The handicapped child is laid down on its abdomen on top of the sling so that the shoulder straps 42 extend on either side of the head, the crotch strap 40 extends between the child's legs and the body strap sections 44 and 50 extend out on both sides of the child's torso. The wheeled frame assembly 14 is then positioned over the child with the rigid panel member 20 centered over the child's back. The body strap sections 44 and 50 are then brought around the child and over the panel member 20 through guide notches 84 therein preventing longitudinal and inward movement relative to the panel member, as shown. On the top of the panel member the straps are buckled so that the child is suspended in the sling at a proper crawling height from the floor 22. The shoulder straps 42 are then brought over the child's shoulders, criss-crossed and clamped in place by the clamps 70. Finally, the crotch strap 40 is brought up between the child's legs and clamped in place by the clamp device 70 at the end 28 of the panel member 20.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. In a crawl training device having a wheeled frame, a body support, flexible means for suspending the body support and a relatively rigid panel secured to the frame having a peripheral portion and opposite longitudinal ends, the improvement comprising means mounted above the body support for anchoring the flexible means directly to the panel and guide means on the panel engageable by the flexible means to prevent longitudinal and inward movement thereof for positioning the suspended body support below and in alignment with the panel, said flexible means including longitudinally spaced body holding straps extending laterally from the body support in encircling relation to the panel between said ends thereof, said guide means including a plurality of formations on the peripheral portion of the panel receiving the holding straps therein while enabling removal thereof by outward movement relative to the panel.

2. The improvement as defined in claim 1 wherein the frame includes a pair of leg assemblies interconnected in longitudinally spaced relation by the panel and caster wheel means connected to each of the leg assemblies for wheeled ground support of the frame, at least one of the leg assemblies including a bridging portion overlying the panel adjacent one of the longitudinal ends thereof and a pair of side portions extending downwardly and longitudinally beyond said one of the ends from the bridging portion is laterally spaced relation to the panel, said caster wheel means being connected to the side portions.

3. The improvement as defined in claim 2 wherein said anchoring means includes a pair of clamps secured to the panel at one of the ends thereof and a single clamp secured to the panel at the other of the ends.

4. The device as defined in claim 3 wherein said body support comprises a flexible sling.

5. The improvement as defined in claim 4 wherein said flexible means comprises a pair of laterally spaced, shoulder straps extending from the body support and engageable by said pair of clamps at said one of the ends of the panel and a crotch strap extending from the body support and engageable by said single clamp at the other end of the panel.

6. The improvement as defined in claim 5 including padding means restrictively secured to the shoulder and crotch straps and to the sling between the laterally extending body holding means for cushioning all tensioned, body engaging surfaces of the body support and the flexible means.

7. The improvement as defined in claim 6 wherein said formations of the guide means is established by spaced notches formed in the panel at said opposite ends thereof and longitudinally therebetween through which the straps and body holding means extend.

8. The improvement as defined in claim 1 wherein said anchoring means includes a pair of clamps secured to the panel at one of the ends thereof and a single clamp secured to the panel at the other of the ends.

9. The improvement as defined in claim 8 wherein said flexible means further includes a pair of laterally spaced, shoulder straps extending from the body support and engageable by said pair of clamps at said one of the ends of the panel and a crotch strap extending from the body support and engageable by said single clamp at the other end of the panel.

10. The improvement as defined in claim 1 including padding means restrictively mounted on the body support for cushioning all body engaging surfaces thereof tensioned under load.

11. The improvement as defined in claim 1 wherein said formations of the guide means is established by spaced notches formed in the panel at said opposite ends thereof and longitudinally therebetween through which the flexible means extend.

12. In a creeper device including a wheeled frame, a body support and flexible suspension means for suspending the body support, the improvement comprising a rigid panel secured to the frame having a peripheral portion to which the flexible suspension means is anchored, body positioning loops connected to the support in encircling relation to the panel and in spaced relation to the flexible suspension means and adjustable means connected to the loops above the panel and in engagement therewith for dimensionally varying said loops and guide means on the peripheral portion of the panel for preventing movement of the loops longitudinally and inwardly of the panel while enabling removal thereof by outward movement, said guide means including a plurality of formations through which the loops extend.

13. The improvement as defined in claim 12 including releasable anchoring means mounted on said peripheral portion of the panel for adjustably supporting the suspended body support.

14. The improvement as defined in claim 13 wherein said flexible means comprises a pair of laterally spaced, shoulder straps extending from the body support into engagement by the releasable anchoring means and a crotch strap extending from the body support into engagement with the releasable anchoring means.

15. The improvement as defined in claim 14 including padding means restrictively mounted on the shoulder and crotch straps and the body support for cushioning all body engaging surfaces thereof tensioned under load.

16. The improvement as defined in claim 15 wherein said guide formations on the peripheral portion of the panel is formed by spaced guide notches through which the straps and the loops extend.

17. The improvement as defined in claim 14 wherein said guide formations on the peripheral portion of the panel is formed by spaced guide notches through which the straps and the loops extend.

18. The improvement as defined in claim 14 wherein said body positioning loops are secured to the body support by the guide formations between said shoulder and crotch straps.

19. In a crawler including a support cushion from which suspension straps extend in one direction and to which transverse straps are connected, opposite ends of said transverse straps having fastener elements, and wheeled means movably supporting the cushion for movement in said one direction, a rigid panel secured to the wheeled means above the cushion, said panel having a peripheral portion to which the suspension straps are anchored with the cushion suspended therebelow and guide means on the peripheral portion through which the transverse straps extend from the cushion in body encircling relation to the panel for interconnection of the fastener elements above the panel, said panel having an upper surface engaged by the interconnected fastener elements in response to tensioning of the transverse straps by the loading of the cushion, said guide means including a plurality of formations on the peripheral portion of the panel preventing movement of the transverse straps therein in said one direction and inwardly of the panel while enabling removal by outward movement relative to the panel.

* * * * *